May 3, 1966  W. R. KORTHOF ETAL  3,249,311
WINDING HEAD FOR MOTOR ARMATURES
Filed Oct. 10, 1962  4 Sheets-Sheet 1

INVENTORS
WILLEM R. KORTHOF
JAN PALS
BY
AGENT

INVENTORS
WILLEM R. KORTHOF
JAN PALS
BY
AGENT

May 3, 1966 W. R. KORTHOF ETAL 3,249,311
WINDING HEAD FOR MOTOR ARMATURES
Filed Oct. 10, 1962 4 Sheets-Sheet 3

INVENTORS
WILLEM R. KORTHOF
JAN PALS
BY
AGENT

INVENTORS
WILLEM R. KORTHOF
JAN PALS

United States Patent Office 3,249,311
Patented May 3, 1966

3,249,311
WINDING HEAD FOR MOTOR ARMATURES
Willem Reindert Korthof and Jan Pals, Drachten, Netherlands, assignors to North American Philips Company, Inc., New York, N.Y., a corporation of Delaware
Filed Oct. 10, 1962, Ser. No. 229,682
Claims priority, application Netherlands, Oct. 24, 1961, 270,582
9 Claims. (Cl. 242—1.1)

It is known to construct a coil-winding machine for uninterruptedly providing the poles of rotors of small electric collector motors with series-arranged coils and loops lying between the various coils consisting of insulated metal wire. Such a coil winding machine has a shaft capable of rotating with two different angular velocities. The shaft is provided with a winding head comprising a device for receiving the rotor provided with a shaft, in which device the rotor is inserted and locked in a manner such that the rotor shaft is at right angles to the center line of the winding head, while the wire supplied to said head crosses said center line. The winding head is provided with means controlled by the machine to remove the locking of the rotor after winding a coil at low speed of the head and to gradually turn the rotor in a manner such that if the rotor is locked again a following coil can be wound, while during the rotation the wire is gripped by a hooked member in a manner such that a loop is formed in the wire. One of the draw backs of such a known machine is that all the loops remain on the hook, so that after completing the winding of the rotor they get easily tangled. In addition, before the loops are connected to the collector they have to be twisted and finally it is possible that owing to the winding of a coil stress arises in the loop so that it may break.

The invention avoids these drawbacks and is characterized in that in a coil-winding machine as described above the hooked member is adapted to perform an axial movement in a direction which crosses the center line of the rotor shaft and to perform a rotation about its own shaft. The axial movement is controlled by the means which cause the gradual rotation of the rotor at low speed of the winding head, the rotation of the hooked member being caused by means which are controlled by the variations occurring in the angular velocity of the winding head.

One advantageous feature of the invention is characterized in that the hooked member is constructed so that in one direction of rotation the formed and twisted loop is retained while in the other direction of rotation it is detached. In this case no special devices are required for detaching the loop.

Another advantageous feature of the invention comprises means to store the loop, which is formed by the axial movement of the hooked member and twisted by the rotation of said member, approximately parallel to and in the device for receiving the rotor shaft. In this manner the loops cannot get entangled and remain stretched and at their places.

According to a further advantageous feature of the invention, the winding head comprises one or more flexibly loaded members which can each rotate about a shaft which is provided eccentrically with respect to this head, the rotation of which members between various angular positions as a result of the various angular velocities of the head causing the rotation of the hooked member. In this manner, the difference in speed of the head which must exist all the same for displacing the rotor causes the loop to be formed entirely automatically.

Although the members can be locked in various manners, a simple construction is obtained, if, according to another embodiment of the invention, helical springs are used for this purpose.

A further feature of the invention comprises a stop member which can be adjusted outside the head in order to restrict the rotation of the excentrically provided members in one direction.

A further advantageous feature of the invention comprises a spoke wheel which consists of a hub which is provided with spokes enclosing equal sectors, which wheel is adapted to rotate about a shaft crossing the rotor shaft and the number of spokes of which equals the number of coils to be provided on the rotor minus one, while the size of the sectors and the place of the shaft carrying the wheel are such that the hooked member can perform an axial movement between two successive spokes.

According to a further feature of the invention, the spoke wheel is coupled to a sleeve rotatable about the shaft by a freewheel clutch having the same number of coupling positions as the number of spokes. The sleeve is provided with an extension and the rotation thereof in the direction in which the wheel is taken along is limited by a fixed stop member. When rotating in the other direction the wheel is retained by a second fly wheel clutch and a helical spring is present provided concentrically about the shaft which spring forces the two couplings against each other and the extension against the stop member in a manner such that with the hooked member retired and the loop twisted, this loop detached by the rotation of the hooked member can be provided against the rotor shaft by the rotation of the spoke wheel caused by the differences in angular velocity of the winding head.

A further feature of the invention is characterized in that the device for receiving the rotor shaft consists of two sleeves lying diametrically in the winding head, said sleeves having, on their open sides facing one another, an axial notch for passing the rotor shaft, one sleeve being rotatable about a pin provided with a notch corresponding to the notch in the sleeve, the second sleeve also being rotatable about a pin, on which sleeve one of the walls bounding the notch is provided with a lug in a manner such that the twisted loop can be provided between the lug and the end of the shaft in the sleeve.

According to a further feature of the invention, the winding head comprises a central shaft which, with respect to the head, is capable of moving axially only and with which the rotating and locking devices of the rotor are connected, the axial movement of this central shaft being controlled by a cam roller provided on the winding head which roller may co-operate with a curved surface of the machine.

According to still a further feature of the invention, a rotatable sleeve is provided around the central shaft which sleeve is provided with two juxtaposed tooth wheels one of which is adapted to co-operate with the flexibly loaded members rotatable about an eccentrically provided shaft, the other toothed wheel being adapted to co-operate, via a transmission, with a toothed wheel on the hooked member in a manner such that by rotation of the shaft comprising the eccentrically provided members a rotation of the hooked member can take place.

According to another feature of the invention a toothed rack is connected to the locking device, which toothed rack is adapted to co-operate, via a toothed wheel transmission, with a second toothed wheel on the hooked member in a manner such that when the toothed rack is moved in axial direction, an axial movement of the hooked member in the opposite direction takes place.

In order that the invention may readily be carried into effect, one embodiment thereof will now described more fully, by way of example, with reference to the accompanying drawings which show a winding head of a coil winding machine as an embodiment of the invention and in which FIGURE 1 is a cross-section taken on the line 1—1 of FIGURE 2 viewed in the direction of the arrows;

Figure 1:
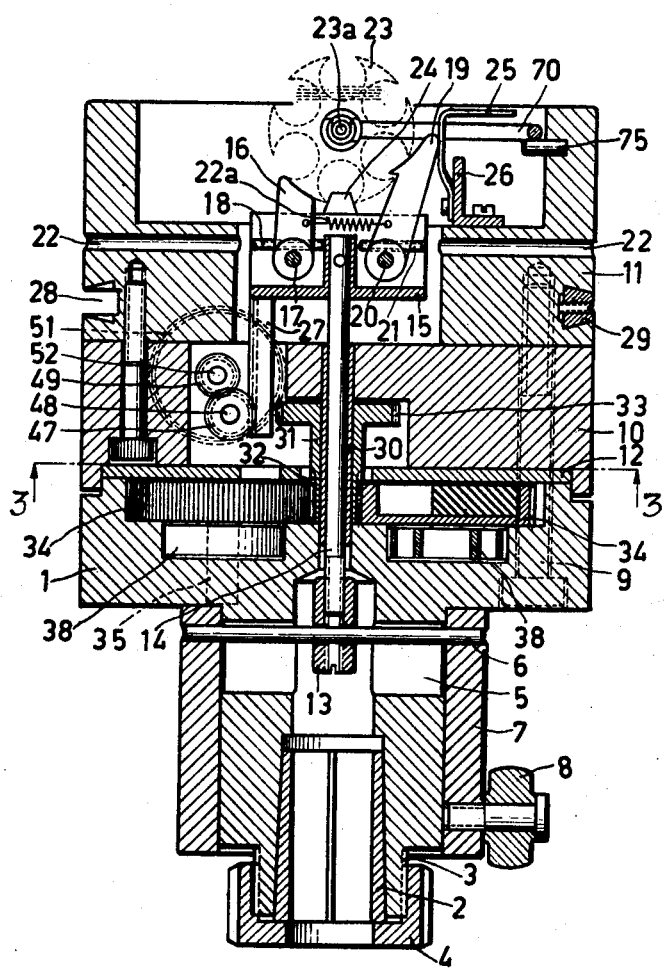

In the drawings, 1 is a housing of a winding head comprising a conical sleeve 2 the end of which is provided with screw thread on which a nut 4 is screwed. By means of this nut 4 and the conical sleeve 2, the winding head can be attached to the shaft of a motor (not shown) of a coil winding machine. The housing 1 has a groove 5 in which a pin 6 is located. This pin 6 is connected to a sliding sleeve 7 which is provided with a cam roller 8. An intermediate ring 10 and an upper portion 11 are connected to the housing 1 by means of screws 9, a filler plate 12 being provided between the housing 1 and the intermediate ring 10. The pin 6 is connected to a central shaft 14 by means of an adjustable nut 13, which shaft supports a U-shaped supporting member 15. A pawl 16 rotatable about a pin 17 is provided in this supporting member 15, which pawl is provided with a threaded bore receiving an adjustable stop screw 18. A locking pawl 19 which is rotatable about a pin 20 and which is also provided with a threaded bore receiving adjustable stop screw 21 is also present. Both adjusting screws 18 and 21 can be reached through apertures 22 in the upper portion 11 for adjusting their position relative to the central sleeve of support 15. The two pawls are drawn together by a draw spring 22a against the stops provided by these screws abutting against the central sleeve portion of member 15. A six-pole rotor 23 drawn in broken lines comprises a shaft 23a. The rotor 23 is to be wound and is locked against rotation during winding by two cams 24 present on either side of the U-shaped supporting member 15. A spring 25 which is connected to the table 26 loads the pawl 19. The U-shaped supporting member 15 further comprises a toothed rack 27. The upper portion 11 comprises a dovetailed groove 28 in which adjustable balance weights 29 are provided.

Figure 7:
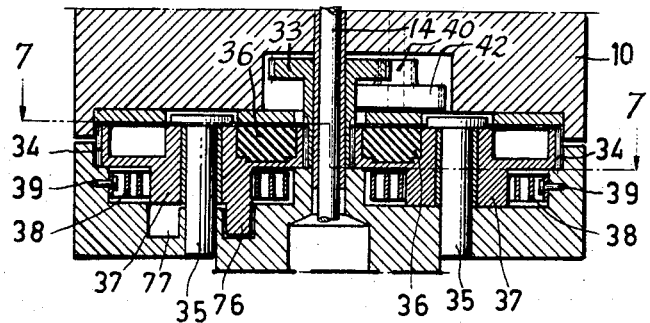
FIGURE 7 is a cross-sectional view of the lower and central portion of the winding head taken on the line 6—6 of FIGURE 2 viewed in the direction of the arrows.
Figure 8:
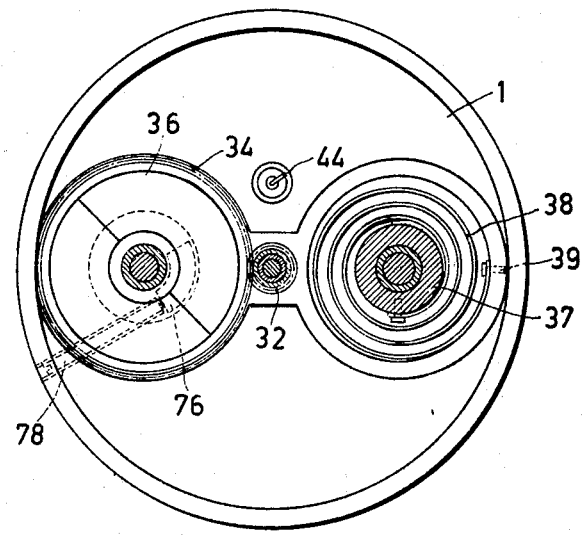
FIGURE 8 is a cross-section taken on the line 7—7 of FIG. 7 and again viewed in the direction of the arrows.

Around the shaft 14 is located a sleeve 30 in which said shaft can slide. Concentrically with this sleeve lies a sleeve 31 which at its lower end is provided with teeth 32; the upper end of the sleeve 31 is rigidly connected to a toothed wheel 33. As best seen in FIGS. 7 and 8, lower toother wheel 32 co-operates with toothed wheels 34 which are adapted to rotate around pins 35. Toothed wheels 34 are weighted by lead 36 which fills a half of each wheel. A hub 37 of these toothed wheels 34 is extended and is connected to the end of a helical spring 38 the other end of which is connected to the wall of the housing by means of a screw 39. The hub 37 further comprises a stop member 76 which is located in an annular space 77. An adjustable pin 78 is provided in the housing and co-operates with the stop member 76. The toothed wheel 33 co-operates with a toothed wheel 40 which is capable of freely rotating about a shaft 41 and which is rigidly connected to a toothed wheel 42.

Figures 4, 5:
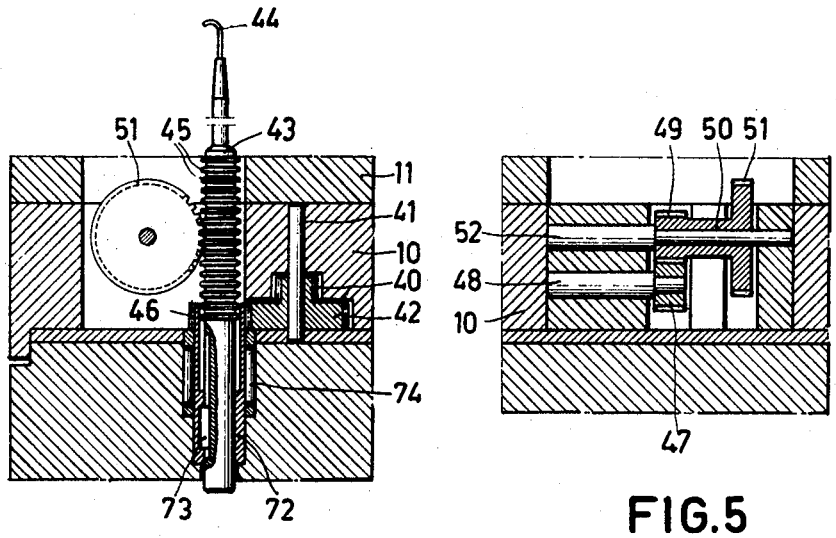
FIGURE 4 is a cross-section taken on the line 4—4 of FIGURE 3 again viewed in the direction of the arrows.
FIGURE 5 is a cross-section taken on the line 5—5 of FIGURE 3 also viewed in the direction of the arrows.
Figure 6:
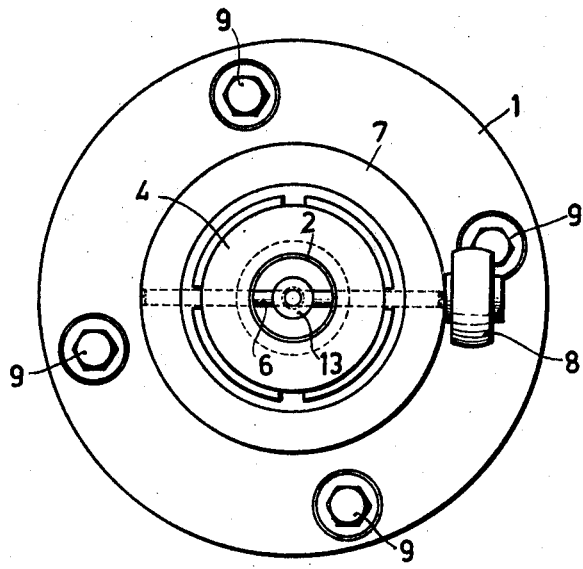
FIGURE 6 is a bottom view of the winding head shown in FIGURE 1.

In the intermediate ring 10 and in the upper portion 11 there is located a shaft 43 (best seen in FIG. 4) which at its upper end is provided with a hook 44. Part of the circumference of this shaft 43 is provided with rings 45, the cross-section of which is tooth-shaped so that a cylindrical rack is formed. Around this shaft 43 there is located a toothed wheel 46 having a sleeve 72 which co-operates with the toothed wheel 42. The sleeve 72 is connected, by means of a key 73, to the shaft 43 pivoted in a needle-roller bearing 74. As seen in FIGS. 1 and 5, a toothed wheel 47 co-operating with the toothed rack 27 is adapted to freely rotate about a shaft 48 and co-operates with a toothed wheel 49 which is connected to a toothed wheel 51 by means of a sleeve 50. The sleeve 50 is adapted to rotate about a shaft 52. Both shafts 48 and 52 are rigidly connected in the intermediate ring 10. The toothed wheel 51 co-operates with the annular teeth 45 of the shaft 43.

Figure 2:
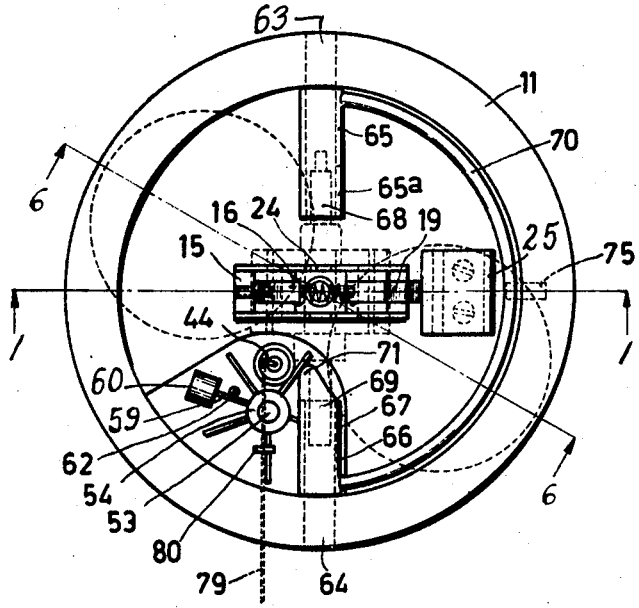
FIGURE 2 is a plan view of the winding head shown in FIGURE 1.
Figure 3:
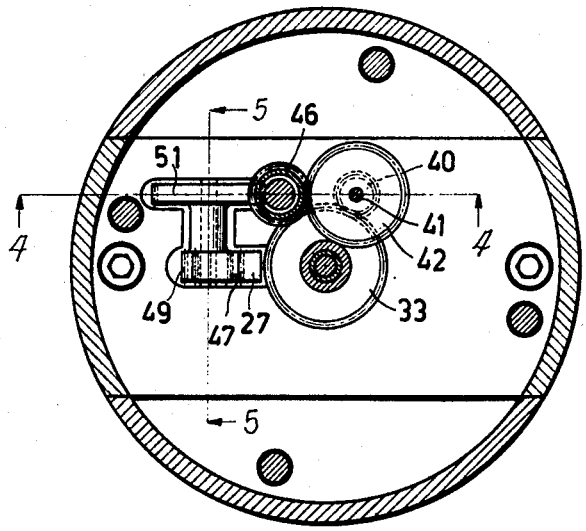
FIGURE 3 is a cross-section of the winding head shown in FIGURE 1 taken on the line 3—3 and viewed in the direction of the arrows.
Figure 9:
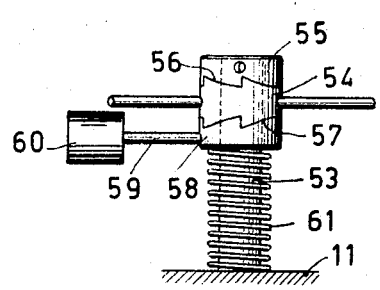
FIGURE 9 shows on an enlarged scale a spoke wheel having five spokes and a double claw clutch as seen in plan in FIG. 2.

As seen in FIGS. 2 and 9, the upper portion 11 supports a shaft 53 around which a spoke wheel 54 rotates. This spoke wheel comprises five spokes, or one spoke less than the number of poles of the rotor which is to be wound. The spokes divide the wheel into an equal number of sectors, each sector being so large that the shaft 43 with the hook 44 can move into each sector. A ratchet mechanism comprises ring 55 rigidly connected to the shaft 53 and having a series of teeth; the upper side of the wheel 54 has teeth 56 meshing with the teeth of ring 55 and its lower side has teeth 57 which co-operate with the teeth of sleeve 58 which is freely rotatable about the shaft 53. The sleeve 58 is provided with a rod 59 and a weight 60 connected to it. A compression spring 61 keeps the teeth of these parts meshed and also urges arm 59 against a stop member 62 which limits the rotation of the weight 60 in a clockwise direction. The number of teeth equals the number of spokes. In addition, this upper portion 11 of the winding head comprises two pins 63 and 64 arranged diametrically with respect to each other and in a horizontal plane. Two sleeves 65 and 66 each provided with grooves 65a and 67 are rotatable about these pins. The pins 63 and 64 have corresponding grooves 68 and 69. The two sleeves 65 and 66 are connected together by a rotatable brace 70. When brace 70 is vertical the grooves 65a and 68 are aligned and groove 67 and 69 are also aligned so that the shaft of a rotor is received by pins 63, 64 and freely rotatably held by sleeves 65 and 66. The sleeve 66 has integral with it a loop catching lug 71 to be described with the operation of the winding head. In the lower position the brace 70 engages a pin 75.

The operation of the winding head described is as follows. It is assumed that, as shown in dotted lines in FIGURES 1 and 2, a six-pole rotor is to be wound.

The brace 70 is first rotated until it is vertical in an upstanding position. As a result of this, the grooves 65a and 67 become located above the corresponding grooves 68 and 69 in the pins 63 and 64, so that the rotor shaft can be inserted (dropped into the aligned grooves). If this rotor shaft with the rotor is in its place, the brace 70 is again brought to its horizontal positon and the shaft of the rotor is consequently enclosed. When the rotor is inserted pawls 16 and 19 are pushed aside and the cams 24 hold the rotor in the desired position. The end of the wire is attached somewhere, for example wound a few times around the rotor shaft.

When the winding head is not rotating weight 60 with the arm 59 engages the stop member 62 and the toothed wheels 34 are in the position shown in FIGURE 8; the helical springs 38 are partially released; they have a small pretension. When the machine is switched on and the winding head rotates at high speed which may be from 8000 to 9000 r.p.m., two of the rotor gaps are wound. In addition, the weighted toothed wheels 34 are moved by centrifugal force into a different position since the weights 36 are flung outwards by the centrifugal forces, the toothed wheels 34 thus rotate around the shaft 35. As a result of this, first of all the springs 38 are placed in tension.

Also the weight 60 is flung outwards so that sleeve 58 is rotated by weight 60 and arm 59 in a counterclockwise direction in FIG. 2 (clockwise as seen in FIG. 9), but the spoke wheel 54 remains stationary since the teeth on the ring 55 prevent its rotation but slippage is provided between the teeth of wheel 54 and sleeve 58 (FIG. 9). As a result of the rotation of the toothed wheels 34, the shaft 43 with the hook 44 is also rotated via the toothed wheel transmission 32, 33, 34, 42 and 46. For the time being, however, this has no effect at all. As soon as the rotor slots in question are wound with the required number of turns, the number of rotations of the winding head is reduced as rapidly as possible to, for example, 50 r.p.m., if desired while using electrically energized brakes and electric counters. As the same time, a profiled ring on the machine (not shown) is made to co-operate with the cam roller 8 in a manner not shown and, for example, also electrically, so that this roller 8 performs an axial movement (moves down in the drawing). As a result of this, first of all the sliding sleeve 7 is pulled downwards, in consequence of which the shaft 14 and the pawls 16 and 19 are also lowered (FIGURE 1). By the catch on the pawl 19, the rotor is rotated through 30°, which is possible since the abutment members 24 are drawn out of the rotor gap and the rotor is free to turn in the pins 63, 64 and associated slevees 65, 66.

As a result of the movement of the sliding sleeve 7, the shaft 14, the U-shaped support member 15, and the toothed rack 27 are lowered and by this movement the hook 44 is moved upwards and outside the actual winding head by the toothed wheel transmission rack 27–47–49–51 and the teeth 45 on the shaft 43 co-operating with the wheel 51, which also form a rack. This hook thus grips the wire 79. The roller 8 is now again brought into the initial position, the rotor being again rotated through 30° this time by the pawl 16 and locked in this new position by the abutment member 24. At the same time the hook 44 with the wire is lowered, so that a loop is formed in the wire. Now the machine is switched to full speed and the second coil is wound.

As a result of the decreasing speed during which rotor position is changed the toothed wheels (weights) 36 have again assumed their initial position owing to the force of springs 38, the stop members 78–76 determining this position. As the angular speed of the winding head is increased, the weights 36 again fling outwards and the springs 38 are again put under tension. As a result of this, however, the shaft 43 with the hook 44 is rotated about its axis a few times and the hook 44 is twisted to form a loop in the wire 79. The rotation is carried out, as explained above, by the transmission 32–33–40–42–46; the stop members 78–76 ensure that the hook is returned to its correct position.

The weight 60 was flung outwards by acceleration but as indicated above, it did not take along the spoke wheel 54. The formed and twisted loop is therefore in a sector between two spokes of wheel 54. The hook 44 is shaped so that the twisted loop is retained by the hook in one direction of rotation of the shaft 43. Also when the shaft 43 does not rotate, the loop is still in the hook. However, if the shaft 43 rotates in the other direction, which is the case if the angular velocity of the winding head decreases, the hook 44 is positioned for detachment of the (twisted) loop. On deceleration the weight 60 flings back against the stop member 62 and now the teeth on sleeve 58 rotate the spoke wheel 54 (clockwise in FIG. 2) which catches the wire loop in one of the sectors defined by a pair of spokes. The weights 36, springs 38 and weight 60 as well as the transmissions are chosen so that the movement of the spoke wheel 54 takes place on deceleration before the shaft 43 with the hook 44 makes its axial movement. The formed and twisted loop is taken along exclusively by the rotation of the wheel 54, the end of the loop being detached from the hook 44 by this rotation, and as a result of the centrifugal force still acting upon the twisted loop, this loop is caught by the lug 71 which projects into the path of the loops formed by hook 44. The loops are hooked over the lug 71 by the spoked wheel 54. The loops of wire are thus secured against entanglement when the rotor is displaced by pawls 16, 19. Then, after the displacement of the rotor, the cycle is repeated.

The movement of the toothed wheels (weights 36) when the number of rotations decreases by the springs 38, as a result of which, as indicated, the shaft 43 with the hook 44 is rotated, may of course be effected since then no loop is present on the hook 44.

It is clear that the spoke wheel 54 must have a number of spokes and sectors enclosed by these spokes which is equal to the number of poles on the rotor and consequently to the number of coils to be made on the rotor to be wound less one. For, the beginning of the wire and the end must be twisted together after winding all the coils.

Instead of the spoke wheel equivalent known arrangements (not shown) may be used, for example, a picker which removes the twisted loop from the hook, however, with the comparatively large centrifugal forces a symmetric construction is to be preferred.

Also instead of the helical springs 38, other flexible members may be used, for example rubber buffers and the like. However, helical springs are normally obtainable in the desired dimensions, and, in addition, they can easily be built in and, if desired, be prestretched a little.

The winding head described permits the winding of rotors at high speed; the actual winding of each coil may be carried out at 8000 to 9000 r.p.m., the displacement of the rotor and the forming of the loop being effected at 50 to 60 r.p.m. The whole operation is effected automatically. The machine for driving the head may be provided with contacts, by which it stops when all the coils are wound and the operation is restricted to the removal of the wound rotor and the breaking of the wire, introducing an unwound rotor, attaching the end of the wire to, for example, the shaft and again switching on the machine.

What is claimed is:

1. A rotatable winding head comprising means for rotatably securing a rotor having a shaft on said head with said rotor being transverse to the axis of rotation of said head, axially movable means for engaging and locking said rotor against rotation and positioning said rotor, a hook member for forming loops in the wire supplied to said head for winding said rotor, means mounting said hook member adjacent a rotor on said winding head for both axial and rotary movement, means responsive to the movement of said axially moveable means for axially moving said hook member into position for grasping the winding wire, and means responsive to a change in the angular velocity of said head for rotating said hook member whereby a loop is formed in said wire.

2. A rotatable winding head according to claim 1 wherein said means responsive to a change in the angular velocity comprises a pair of eccentrically weighted gear wheels operatively connected with said hook shaped member.

3. A rotatable winding head according to claim 2 wherein said hook member is shaped and located relative to the wire supplied to said head for detachably associating said hook member and said loop upon rotation of said hook member in the opposite direction.

4. A rotatable winding head according to claim 3 with the addition of means for detaching said hook member and said loops and securing loops released by said hook member against entanglement.

5. A rotatable winding head comprising means for rotatably securing a rotor having a shaft on said head with said rotor being transverse to the axis of rotation of said head, axially moveable means for engaging and locking said rotor against rotation and positioning said rotor, a hook member for forming loops in the wire supplied to said head for winding said rotor, means mounting said hook member on said head for both axial and rotary movement, means responsive to the movement of said axially moveable means for axially moving said hook member into position for grasping the winding wire, and means responsive to a change in the angular velocity of said head for rotating said hook member whereby a loop is formed in said wire, and rotatable spoke wheel means on said head operatively coupled with said hook member and including means responsive to centrifugal force for rotating said spoke wheel means.

6. A rotatable winding head according to claim 5 wherein said rotatable spoke wheel means includes a ratchet mechanism whereby said spoke wheel is rotated in one direction only in a step by step manner.

7. A rotatable winding head according to claim 5 wherein said rotatable spoke wheel means comprises a shaft fixed at one end of said head, a ring fixed to the other end of said shaft and having axially extending teeth, and a freely rotatable sleeve on said shaft spaced from said ring and having oppositely axially extending teeth, a spoke wheel intermediate said ring and said sleeve having teeth adapted to mesh with the teeth on both said ring and sleeve, said sleeve having a radially extending rod and a weight at the end thereof remote from said sleeve, and resilient means urging said sleeve and spoke wheel against said ring.

8. In a rotatable winding head the combination comprising means for rotatably securing a rotor having a shaft on said head with said rotor being transverse to the axis of rotation of said head, means for indexing and positioning said rotor; said means comprising a central shaft axially movable within said head, means adjacent one end of said shaft for positioning it between plural positions and a support member at the other end thereof, said support member carrying rotatable opposed pawl members and having a projecting cam for engagement within a slot of said rotor for normally securing said rotor in its indexed position, said projecting cam being withdrawn from said engagement in one position of said moveable support member and said pawl members indexing said rotor during movement of said support member while said cam is disengaged therefrom; a rack depending from said support member and moveable therewith, axially moveable hook shaped means on said head for forming loops in the wire for winding said rotor, and a gear train intermediate said rack and said hook shaped means for raising and lowering said hook shaped means in timed relation with indexing of said rotor; a pair of eccentrically weighted gear wheels on opposite sides of said central shaft rotatably mounted on said head, a second gear train intermediate said gear wheels and said hook shaped means for imparting rotary movement to said hook shaped means.

9. In a rotatable winding head the combination comprising means for supporting an armature on said head, associated means for selectively indexing and locking said armature relative to said head and means for forming loops in the wire fed to said armature; said means comprising a hook member, means mounting said hook member on said head for both axial and rotary movement, means operatively connected with said mounting means for axially moving said hook member upon indexing of said armature, and means responsive to a change in the angular velocity of said head for rotating said hook member.

References Cited by the Examiner
UNITED STATES PATENTS

| | | | |
|---|---|---|---|
| 1,987,190 | 1/1935 | Holmes | 242—13 |
| 2,394,529 | 2/1946 | Arpurth | 242—13 |
| 3,044,721 | 7/1962 | Wirth | 242—13 |
| 3,121,539 | 2/1964 | Pals | 242—13 |

OTHER REFERENCES

Mantelet: German application 1,094,352, printed Dec. 8, 1960.

Pals: German application 1,098,597, printed Feb. 2, 1961.

MERVIN STEIN, *Primary Examiner.*

RUSSELL C. MADER, *Examiner.*

B. S. TAYLOR, *Assistant Examiner.*